United States Patent
Douglass et al.

[11] 3,797,133
[45] Mar. 19, 1974

[54] CALCULATORS

[76] Inventors: Walter Douglass, 30 Grovewood Close, Chorleywood; Paul John Murgatroyd, 1 Gullbrook, Boxmoor, Hemel Hempstead, England

[22] Filed: Oct. 3, 1972

[21] Appl. No.: 294,593

[52] U.S. Cl. ................................. 35/34
[51] Int. Cl. .......................... G09b 19/02
[58] Field of Search .................. 35/31 R, 24 C

[56] References Cited
UNITED STATES PATENTS

| | | | |
|---|---|---|---|
| 3,486,244 | 12/1969 | Horn | 35/31 R |
| 2,393,162 | 1/1946 | Hayes | 35/24 C X |
| 1,950,072 | 3/1934 | Townsend | 35/31 R |
| 3,613,268 | 10/1971 | Fowler | 35/31 R |
| 3,212,202 | 10/1965 | Heinichen | 35/31 R |

FOREIGN PATENTS OR APPLICATIONS

| | | | |
|---|---|---|---|
| 650,205 | 2/1951 | Great Britain | 35/31 R |

*Primary Examiner*—Wm. H. Grieb
*Attorney, Agent, or Firm*—Wenderoth, Lind & Ponack

[57] ABSTRACT

Calculating apparatus for teaching simple arithmetic comprises a support with a horizontally pivoted operating member in the form of a circular disc from which a segment has been removed to form a plate defined by a circular arc of more than 180° in extent and a straight line between the ends of the arc. The member is pivoted at the centre of the arc to rest in stable equilibrium with the straight edge horizontal. A scale behind the member indicates tilt, the straight edge providing pointers. Pins spaced on either side of the pivot may be loaded with discs having weights proportionate to integral values, the spacing of the pins being in arithmetical progression for multiplication, addition, and subtraction calculations and in geometrical progression for division.

8 Claims, 4 Drawing Figures

CALCULATORS

BACKGROUND OF THE INVENTION

This invention relates to apparatus for performing calculations in the nature of simple arithmetic, such as addition, subtraction, multiplication and division.

SUMMARY OF THE INVENTION

The primary object of the invention is to provide an apparatus of simple and inexpensive construction which can be operable by small children to perform simple calculations of an arithmetical nature, and is thus of assistance in the teaching of arithmetic.

Apparatus in accordance with the invention for making arithmetical computations comprises a support member having a vertical surface, an operating member freely pivotally mounted on the support member in front of the surface on an axis remote from its centre of gravity so that the operating member is supported in a condition of stable equilibrium, a plurality of weighting members of identical mass or integral multiples of a unit of mass, or both, at least one pair of attachment means on the operating member to detachably mount the weighing members on the operating member, the two attachment means of each pair being symmetrically spaced on either side of the pivot axis when the operating member is in equilibrium whereby any weighting member mounted on one means of the pair forms a counterbalance to another weighting member on the other means of the same pair, means on the operating member for indicating the attitude of the operating member, and preferably providing two pointers which lie at the opposite ends of a line, and a pair of arcuate scales on the vertical surface which cooperate with the pointers to quantitatively show the tilt of the operating member on either side of its equilibrium position, the scale markings being in units which are a function of the distance of the attachment means from the pivot axis.

If a series of attachment means on each side of the pivot axis are arranged successively equally spaced by a distance equal to the innermost means from the pivot axis, the apparatus can be readily employed for simple multiplication, addition and subtaction. By making each attachment, in outward succession, twice the distance of its predecessor from the axis, division, addition, and subtraction can be carried out by the apparatus.

BRIEF DESCRIPTION OF THE DRAWINGS

One embodiment of the apparatus and the manner of its operation will now be described in detail by way of example with reference to the accompanying drawings in which.

DETAILED DESCRIPTION OF THE INVENTION

Figure 1:
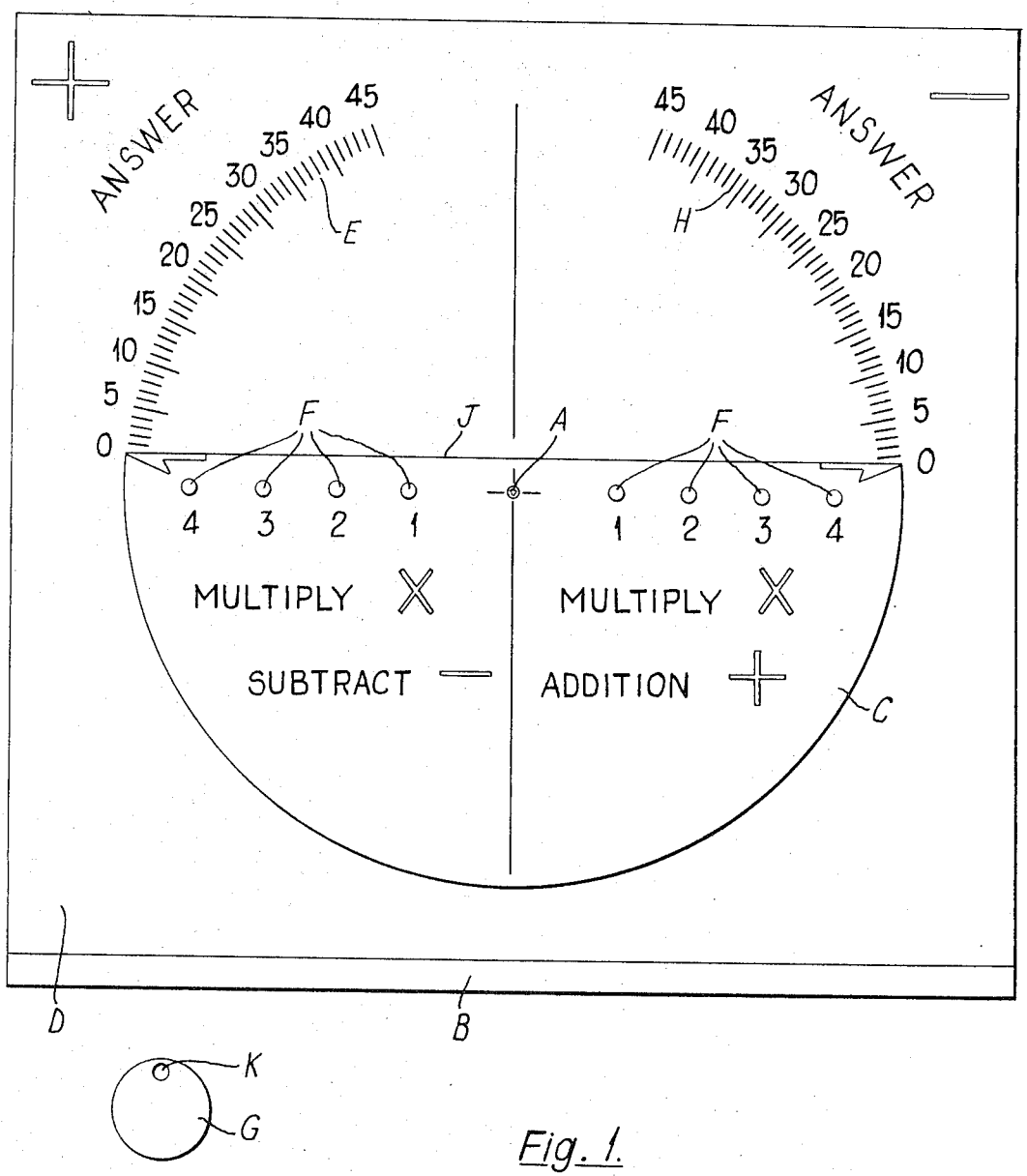
FIG. 1 shows an elevation of the apparatus in accordance with the invention, including one of the weighting members thereof.

In this embodiment a calculating apparatus comprises a base plate B to which is attached an upstanding rectangular flat support plate D having a pivot pin A projecting horizontally from one of its vertical surfaces. The pivot pin provides a mounting for an operating member C which is in the form of a circular disc from which a segment has been removed to form a plate whose shape is defined by a circular arc slightly more than 180° in extent and a straight line adjoining the ends of the arc. The arcuate plate is mounted on the pin by an anti-friction bearing so that the rotational axis coincides with the centre of the circle of which the arc forms part. It will be realized that the centre of gravity of the operating member so formed is spaced from its pivot centre so that if left undisturbed the operating member will remain in stable equilibrium with its centre of gravity vertically below the pivot axis and the edge J defining the straight line part of the periphery lying horizontally. The front surface of the operating member is for preference marked so that the extreme ends of its straight edge J perform the function of pointers. The surface of the support plate behind the operating member is provided with arcuate scales E,H in register with the path of movement of the pointers and indicate the tilt of the operating member when it is disturbed to either side of its position of equilibrium. The scale markings are determined by the calculating function of the apparatus as will be presently shown.

A plurality of short pegs F extend horizontally outwardly from the front surface of the operating member. These pegs form attachment means for a number of small flat discs G all of the same weight which form weighting members, each of the discs having a hole K through it so that it can thereby be placed on or removed from any of the pegs as required. Each peg is of sufficient length so that a number of discs can be placed on it simultaneously.

The pegs are arranged in pairs along a diametral line passing through the pivot axis and parallel with the straight edge J of the operating member and the pegs in each pair are equi-spaced from the pivot axis so that if the same number of discs is placed on each peg of any individual pair the equilibrium of the operating member remains unchanged.

In one arrangement of the apparatus to perform simple addition, subtraction and multiplication, a number of pegs, for example four, are arranged on either side of the pivot axis at successively equal distances therefrom. For convenience the scale on the left hand side is given a plus designation and the scale on the right hand side is given a minus designation. In operation each of the discs is treated as a unit and if a single disc is placed on the right hand peg nearest the axis (numbered 1) the left hand pointer moves over the plus scale as the operating member tilts until a fresh position of equilibrium is obtained. The scale is arranged so that this degree of tilt corresponds with one of its graduations. Similarly, if ten or fifteen discs are placed upon number 1 peg the scale graduation arrangement is such that the left hand pointer coincides with the tenth or fifteenth graduation. Conversely the placing of one or more discs on the innermost peg (number 1) on the left hand side of the pivot axis will cause the right hand pointer to move to a correspondingly numbered graduation on the right hand or minus scale.

It will thus be appreciated that the use of only two (innermost) pegs is sufficient for obtaining the results of simple addition and subtraction. A child being taught such subjects could, for example, count out two or more piles of discs and by placing the piles successively on the appropriate left or right pegs could read off the answer to the corresponding addition or subtraction from the scale marking indicated by one or other of the pointers.

Multiplication is performed by employing the outer pegs. A disc placed on either of the number 2 pegs is then located at twice the position from the pivot axis as a disc on one of the number 1 pegs so that its disturbing force is doubled and it will tilt the operating member to a fresh equilibrium position to cause movement of the pointer over two scale graduations. As an example of such simple multiplication the presence of five discs on number 3 peg, for example, causes the corresponding pointer to move over 15 divisions on the corresponding scale.

The employment of all three capabilities of the apparatus is best illustrated by the following computation:

Three discs on number 2 peg on the plus or right hand side of the operating member causes a plus scale movement of six units. The loading of a further six discs on number 4 peg, also on the plus side, produces an additional scale movement of twenty-four divisions thus showing that the addition of three times two and six times four gives a total of 30. If now one disc is added to number 1 peg on the minus side of the operating member, the counterbalancing effect of this one disc reduces the positive scale reading by one division and a further disc on number 2 peg and three discs on number 4 peg on the minus side of the operating member reduce the positive scale reading indicated by the pointer to 15 showing that the total of three times four plus one times two plus one times one subtracted from 30 gives a result of 15.

Simple equations employing these arithmetical concepts can also be solved as the following example will show:

The equation to be solved is as follows:
$(2 \times 2 + 1 \times 3 + `x` \times 4) - (2 \times 1 + 2 \times 3 + 1 \times 4) = 11$ The problem is to find the value of the unknown quantity '$x$'.

The computation is achieved by placing on the plus side of the operating member two counters on pin 2 and one counter on pin 3 thus causing the operating member to swing until a pointer shows 7 on the plus scale. The minus side of the operating member is then loaded by two counters on peg 1, two counters on peg 3 and one counter on peg 4 which will have the effect of swinging the operating member back until its pointer indicates graduation 5 on the minus scale. Discs are then placed one at a time in succession on the fourth peg on the positive side of the operating member until the pointer reaches graduation 11 on the plus scale and the number of counters necessary to achieve this equilibrium position determines the value of the unknown quantity '$x$'.

Figure 4:
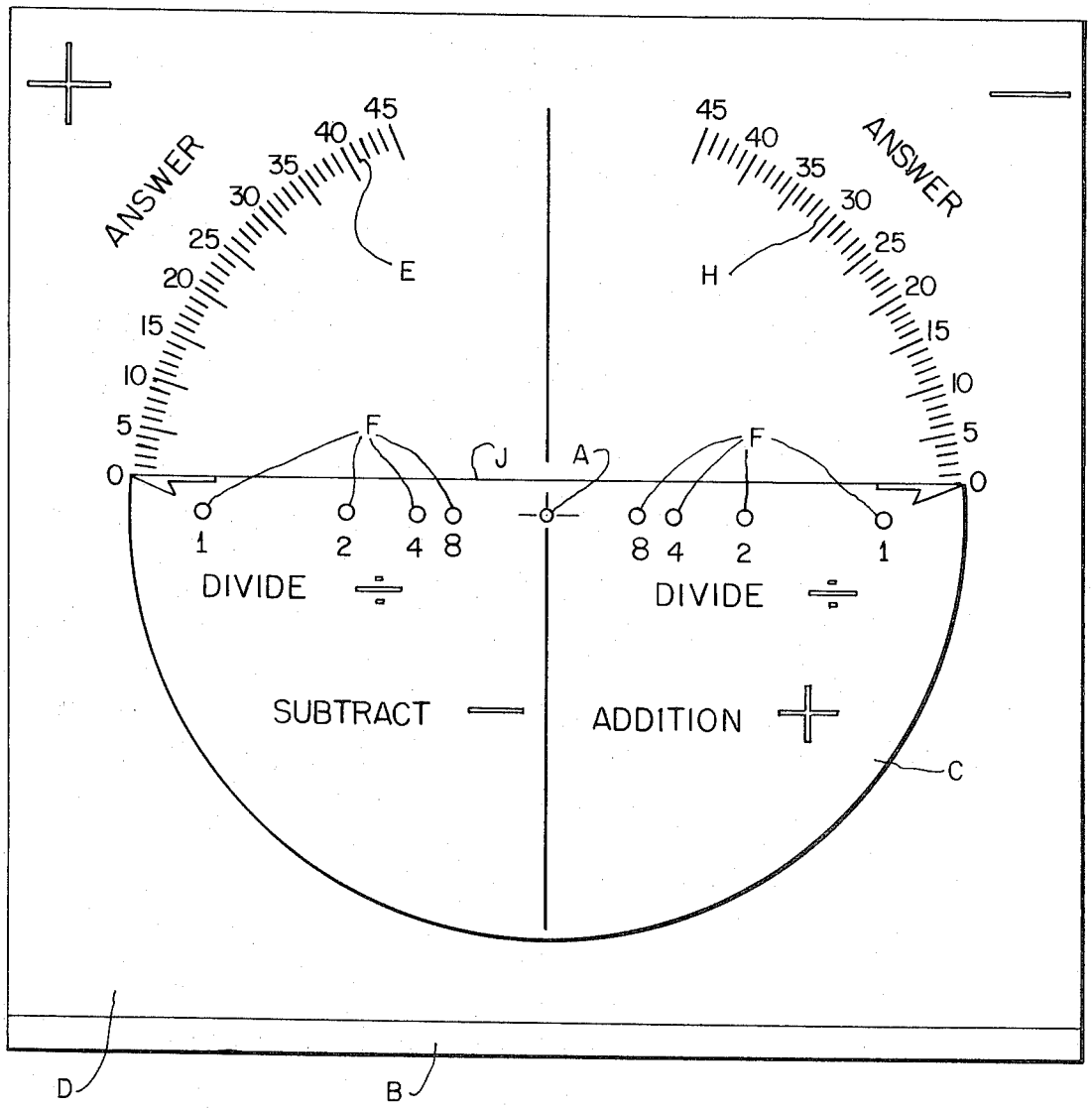
FIG. 4 is an elevation of a modification of the device of FIG. 1.

In order to provide for the performance of simple division the pegs are arranged, as shown in FIG. 4, on the diametral line previously described in such a way that on each side of the pivot axis each successive pin (counting outwardly from the axis) is located at an axial distance which is twice that of the preceding peg. For example, with four pairs of pegs on the operating mechanism the outermost pegs, and which will be treated during the computations as the number 1 pegs, are located as close as convenient to the operating member periphery. The number 2 pegs on each side are then placed at a radial distance from the centre which is half that of the number 1 pegs, the third pair of pegs which will be numbered 4 are half the distance from the pivot axis as the number 2 pegs, and the fourth pair which are numbered number 8 are half the radial distance from the axis as the number 4 pegs. When using the apparatus for division in this form the number of counters on any individual peg corresponds to the dividend, the number of the peg indicates the divisor, and the scale marking shown by one or other of the pointers when equilibrium is achieved indicates the quotient. As before the two scales and the duplication of the pegs in pairs enables the apparatus to provide for addition and subtraction of quotients obtained from the peg and disc arrangement.

An example of such use is illustrated by the computation:

$$10 \div 1 + 10 \div 2 + 10 \div 4$$

To determine the result ten pegs are placed successively on each of pegs 1, 2 and 4 on the positive side of the operating member. The ten pegs on number 1 pin cause the pointer to move through ten graduations on the positive scale, the ten discs on the number 2 peg cause the pointer to move through an additional five graduations, and the ten pins on the number 4 peg cause a further movement of two and a half graduations giving a total sum for the addition of all three quotients of seventeen and a half.

The solution of simple equations containing a single unknown quantity can be achieved in a similar manner to that previously described with reference to multiplication, appropriate numbers of discs being placed upon appropriate pegs for the terms of the equation in which both the dividend and divisors are known and the number of discs or selection of the correct peg in respect of the term containing the unknown quantity being determined experimentally to produce the desired answer to the equation on the correct scale.

It will be appreciated that the scope of the invention is not limited to the above-described embodiment either in its particular form of construction or its use. For example, the configuration of the operating member is not limited to the part circular shape described above. Any form of centrally pivoted structure having a centre of gravity below its pivot axis to provide a condition of stable equilibrium with means for hanging weighting members at equal distances on either side of the pivot axis will suffice. The scales on the support member may be permanently secured thereto or inscribed thereon or can be constructed in the form of detachable sheets so that they may be varied to alter the range of the calculations possible or the type of calculations. The form of the attachment means can differ from the simple pegs above described and any attachment means may be detachably connected to the operating member in such a way that different arrangements of the spacing of the attachment means are possible with a single operating member. The weighting means can be simple discs, as previously described, or can be shaped in various ways, for example, to provide interest for children using the apparatus as an arithmetical teaching aid. In addition to simple arithmetical computations the weighting members, attachment means, and scales could be provided with appropriate calibration indices to give quick calculations of matters of more adult interest, such as stock market figures and betting odds. It is also to be noted that since the result of a calculation is provided by an angularly arranged scale the apparatus can also be employed to obtain the answers to trigonometrical problems.

In order to improve the range of apparatus, the unitary weighting members described above can be augmented by alternative or additional weighting members having weights which are multiples of the unit members. Thus, for example, heavier discs having calculation values of, say, 5 or 10 can be provided which have five or ten times the weight respectively of the unit discs. In the embodiments described above such heavier discs avoid the trouble of loading the operating member with a large number of discs when the numerical quantities involved in using the apparatus contain two or more digits and ensure that the peg lengths can be maintained within reasonable limits.

As above described the apparatus is capable of demonstrating computations generally performed by children who have at least the rudiments of arithmetical knowledge. However it is also suitable for teaching very young children simple addition and subtraction by the use of only one peg on each side with weighting members which have additive or subtractive characteristics.

Figure 2:
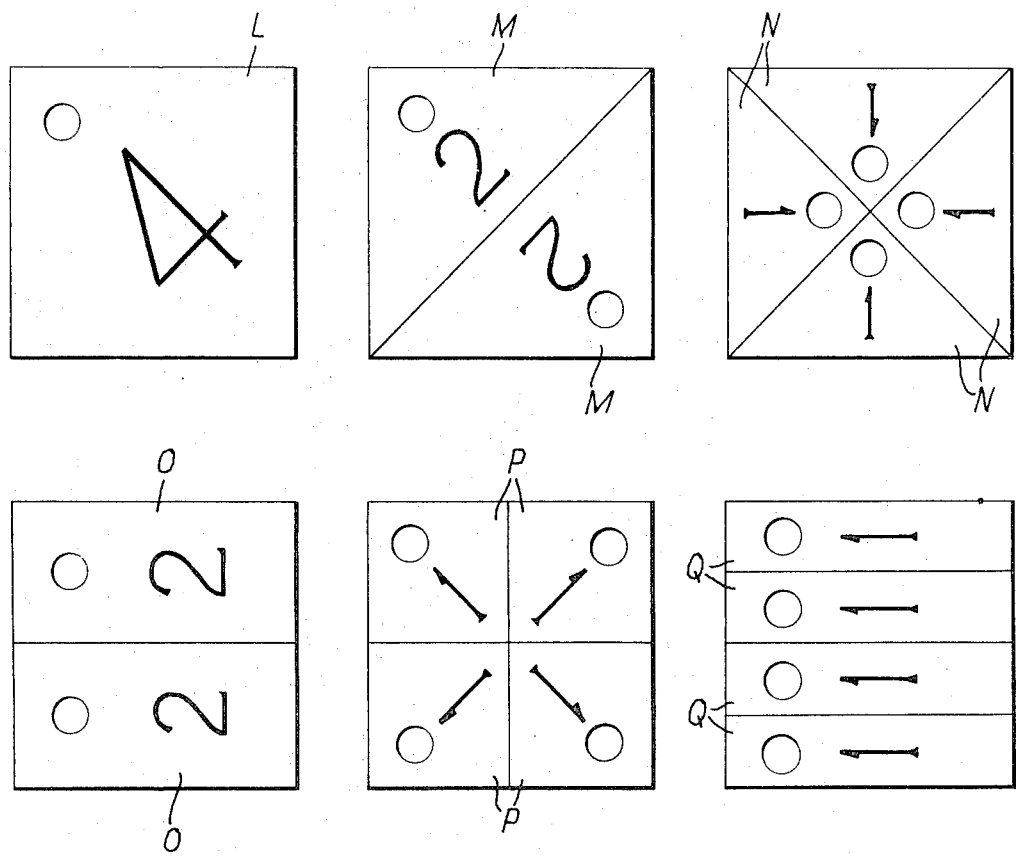
FIGS. 2 and 3 show elevations of alternative forms of weighting members.

FIG. 2 shows examples of such weighting members in elevation. The square weighting member L marked '4' can be counterbalanced by the two right-angled triangular members M each marked '2' and each weighing half the weight of the square. The two members marked '2' can also, as shown in the drawing, be placed together with their hypotenuses in contact to form a square equal in size and shape to the weighting members marked '4' to further demonstrate visually the equivalence of 4 and 2 added to 2. Similarly, four triangular squares N marked '1' can be arranged to form two triangles of the size, weight, and shape of the weighting members marked '2' or a single square equivalent to the weighting member marked '4'. Each weighting member is provided with a hole therethrough for its suspension in a peg of the operating member.

FIG. 2 shows further examples of weighting members O, P, Q, of square or rectangular shape which can be placed in juxtaposition to show their equivalence to a larger square or rectangle in size, shape and weight.

Figure 3:
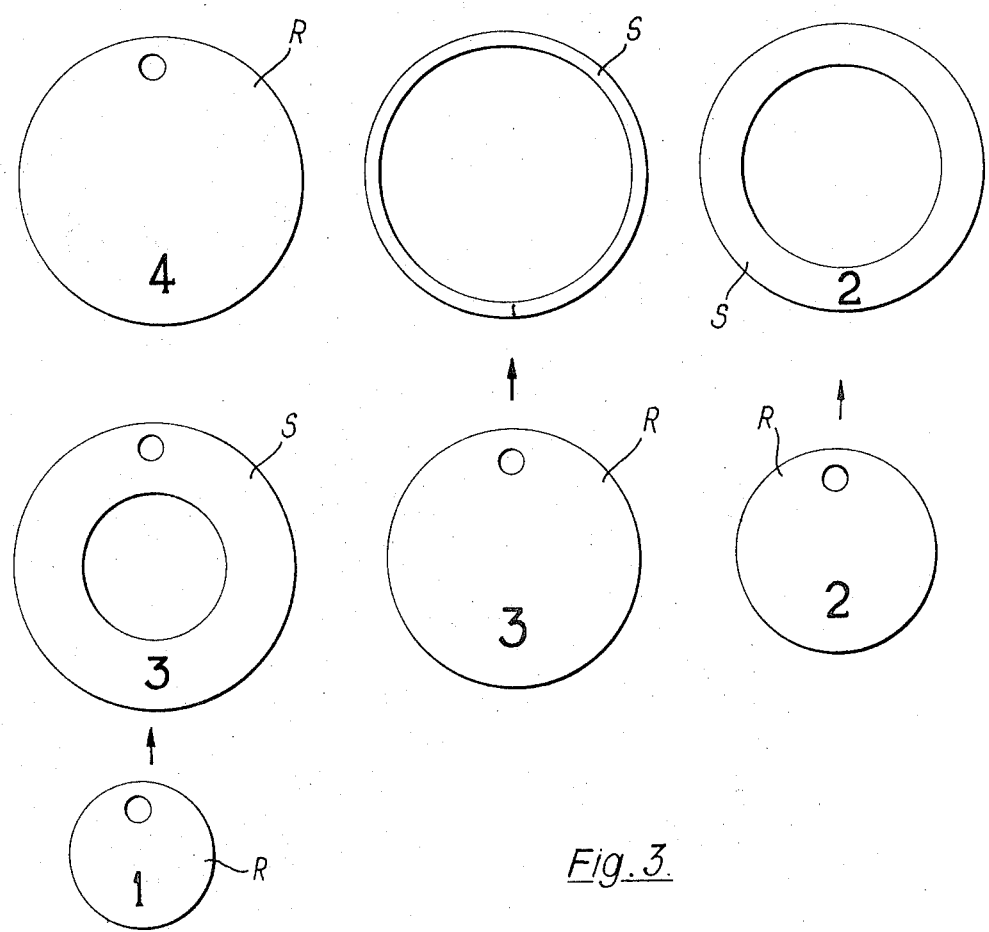

FIG. 3 shows examples of weighting members shaped as discs R and rings S which can be fitted one within another to form discs of a size, shape, and weight equal to larger discs having marking equal to the aggregate of the markings of the component members.

In order to further assist the very young child in correctly arranging the component members, the reverse surface of each member may be provided with a picture or the elements of a picture so that the correct assembly of component members to form the equivalent of a member equal to the 'sum' of the components forms a picture identical with that on the latter member.

While the apparatus shown in FIG. 1 can be employed with weighting members as shown in FIGS. 2 and 3, the provision of a number of pegs on both sides of the pivot point may be confusing to very young children and for this reason it is preferable to employ apparatus having only a single peg on each side of the pivot point with the weighting members shown in FIGS. 2 and 3.

We claim:

1. Apparatus for making arithmetical computations, said apparatus comprising:

a support member having a vertical surface;

an operating member freely pivotally mounted on said support member in front of said vertical surface and on an axis remote from the center of gravity of said operating member, so that the operating member is supported in a condition of stable equilibrium, and said operating member comprising a circular disc having a segment removed so as to provide a plate of which the periphery is defined by a circular arc greater than 180° and a straight line joining the ends of said arc, said member being rotatably mounted on a bearing concentric with the center of said disc;

a plurality of weighting members of integral multiples of a unit of mass;

at least one pair of attachment means of the operating member for detachably holding said weighting members on said operating member, the two attachment means of each pair being symmetrically spaced on either side of said pivot axis whereby said weighting member mounted on one means of said pair forms a counter balance of a similar weighting member on the other means of same pair;

means on said operating member for indicating the attitude of said operating member and providing two pointers which lie at the opposite ends of a line; and a pair of arcuate scales on said vertical surface which co-operate with said pointers to quantitively show the tilt of said operating member on either side of its position of equilibrium taken up in the absence of weighting members, the markings of said scales being in units which are a function of the distances of said attachment means from said pivot axis.

2. Apparatus as claimed in claim 1, wherein said bearing is an anti-friction bearing carried by a pin extending horizontally from said support member.

3. Apparatus as claimed in claim 1, wherein said straight edge of said operating member forms said means for indicating the attitude of said operating member, and said pointers being on the opposite ends of said straight line to co-operate with said scales on said support member.

4. Apparatus as claimed in claim 1, wherein each attachment means comprises a peg extending horizontally from said operating member to be received by a hole in each weighting member.

5. Apparatus as claimed in claim 1, wherein said weighting members are discs.

6. Apparatus as claimed in claim 1, wherein said weighting members are shaped so that at least two such weighting members of a lower face value can be assembled to form a structure identical in shape and size with another weighting member having a higher face value and weight which is equivalent to the aggregate of the weighting members of lower face value.

7. Apparatus as claimed in claim 1, wherein said attachment means on each side of said pivot axis are arranged successively equally spaced by a distance equal to that of the innermost of said means from said pivot axis.

8. Apparatus as claimed in claim 1, wherein each attachment means on each side of said pivot axis in outward succession is spaced twice the distance of its predecessor from said pivot axis.

* * * * *